Oct. 2, 1928.

E. VOLLRATH

BELT CLAMP

Filed Oct. 7, 1926

1,686,300

INVENTOR
Edwin Vollrath
BY
Hervey Barber & McKee
ATTORNEYS

Patented Oct. 2, 1928.

1,686,300

UNITED STATES PATENT OFFICE.

EDWIN VOLLRATH, OF EASTON, PENNSYLVANIA.

BELT CLAMP.

Application filed October 7, 1926. Serial No. 140,042.

This invention relates to clamps of the type used in connecting the ends of pliable strips, with particular reference to driving and similar belts composed wholly or in part of fibrous fabric woven in multiple plies and adapted to withstand severe strains and hard usage under varying conditions of temperature and moisture.

It will be readily understood that belts of this type require occasional length adjustment, being subject to considerable permanent stretch, and that the devices used should be of a simple character, easy to operate and possess an unfailing grip, distributed uniformly throughout the full width of the belt.

It has been demonstrated by tests that per inch per ply, the proportionate strength of many ply belts does not equal that of lesser ply belts, and that the inner plies are disposed to shift on the clamp, partly because of the inability of the said clamp to grip securely all of many plies in an equally effective manner.

It is therefore an important object of the present invention to provide a clamp capable of producing a compressive effect, enhanced by sinuously undulating gripping surfaces and provided with amply rounded corners to avoid sharp bends in the juxtaposed belt ends.

A further feature, of even more magnitude, is in the interposition between the ends of the belt of a metal plate cross corrugated to produce indentations on both sides and found to be conducive in producing a substantially united pull of all fibers irrespective of the thickness of the belt. This plate could, if it is found desirable in any case, be undulated to accord with the aforesaid gripping surfaces of the clamp between which it is positioned. It will also serve to prevent slippage of the inner plies of the belt ends, thereby increasing the aggregate strength of the joint and supporting the bolts against breakage.

These advantages are accomplished by the simple, novel and practical construction and arrangement of parts hereinafter described and illustrated in the accompanying drawing, constituting a material portion of this disclosure, and in which:—

Figure 1:
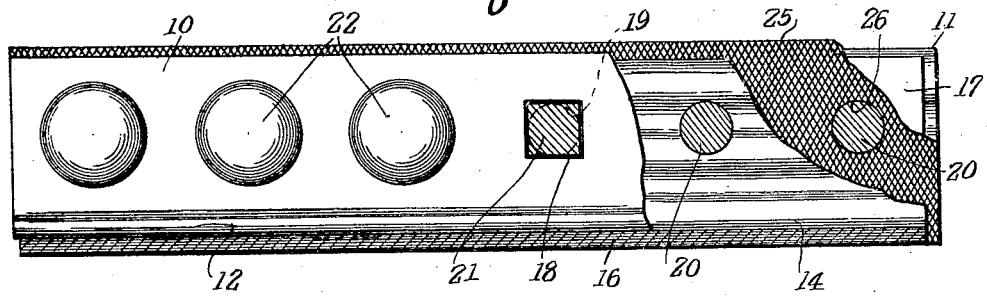
Fig. 1 is a side elevational view, partially in section, of an embodiment of the invention.
Figure 2:
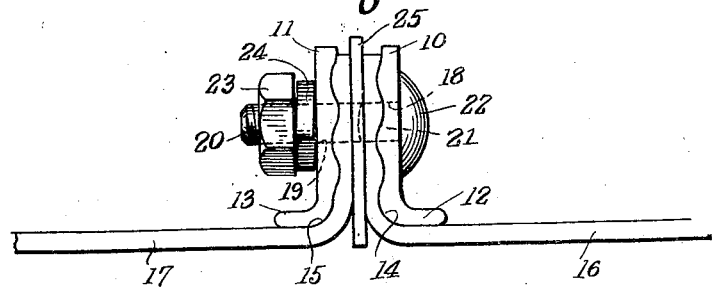
Fig. 2 is an end view thereof.
Figure 3:
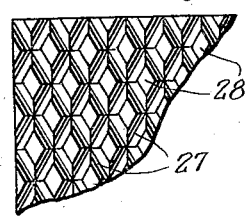
Fig. 3 is an enlarged fragmentary plan view of the intermediate clamp member.

The device comprises two metal clamp plates, designated respectively by the numerals 10 and 11, having right angle flanges 12 and 13 joined by convex curves 14 and 15, the belt ends being indicated by the numerals 16 and 17.

One of the clamp plates, as 10, is provided with a plurality of spaced rectangular openings 18 and the other plate with registering circular openings 19 to receive clamp bolts 20 having a portion 21 of their shanks adjacent their heads 22, shaped in conformity with the openings 18 to prevent turning of the bolts.

These bolts are provided with nuts 23 of any appropriate type and spring lock washers 24, interjacent the nuts and plate 11, retain the bolts when in adjustment.

The inner faces of the plates 10 and 11 are formed to present longitudinal undulations, those on one plate engagingly matching or complementing those upon the other to produce sinuous gripping surface to engage the ends of the belt entered therebetween and which are tightly compressed by the bolts, the bolts passing through appropriate openings in the belt ends.

Disposed intermediate the belt ends is a metal plate 25 extending coincident with the clamp plates and provided with openings 26 for the bolts 20.

Both faces of the plate 25 are cross corrugated, as at 27, to produce a number of sharp teeth 28 adapted to bite into the belt fabric and, due to the pressure exerted by the bolts, operate to prevent the fibers of the inner plies from shifting under stresses to which the belt may be subjected, substantially avoiding the difficulty hitherto encountered in this respect.

It will be apparent from the forgoing that no sharp edges are brought in contact with the belt material whereby it may be damaged and the strain and wear around the bolt openings are minimized by the sinuosities of the clamp plate and the action of the intermediate plate.

While a certain embodiment of the device has been shown and described, it will be understood that changes in the form, arrangements, proportions, sizes and details thereof may be made without departing from the scope of the invention as defined in the appended claim.

Having thus described my invention, what

I claim as new and desire to secure by Letters Patent, is:—

A belt end clamp comprising a pair of opposed clamp members having outwardly curved flanges to contact with the belt and longitudinally undulated inner faces, means for compressing the belt ends between said members comprising bolts with nuts to draw said members together, a plate perforated to receive the bolts and positioned between the said belt ends whereby the said belt ends are held against relative movement.

In testimony whereof I have hereunto affixed my signature.

EDWIN VOLLRATH.